United States Patent [19]

Sakuma et al.

[11] Patent Number: 5,085,501
[45] Date of Patent: Feb. 4, 1992

[54] FIBER OPTIC GYROSCOPE USING OPTICAL WAVEGUIDE COUPLERS

[75] Inventors: Kazuhiro Sakuma, Fuchu; Aritaka Ohno, Hachioji; Eiichi Asami, Hanno; Ryoji Kaku, Tachikawa, all of Japan

[73] Assignee: Japan Aviation Electronics Industry Limited, Tokyo, Japan

[21] Appl. No.: 477,559

[22] Filed: Feb. 9, 1990

[30] Foreign Application Priority Data

Feb. 15, 1989 [JP] Japan .................................. 1-37275

[51] Int. Cl.$^5$ ........................ G01C 19/64; G02B 6/12
[52] U.S. Cl. ................................. 356/350; 350/96.11; 350/96.2
[58] Field of Search .................... 356/350; 372/94; 350/96.11, 96.2

[56] References Cited

U.S. PATENT DOCUMENTS

| | | | |
|---|---|---|---|
| 4,170,399 | 10/1979 | Hansen et al. | 350/96.2 |
| 4,265,541 | 5/1981 | Leclerc et al. | 356/350 |
| 4,588,296 | 5/1986 | Cahill et al. | 356/350 |
| 4,750,800 | 6/1988 | Fournier et al. | 350/96.11 |

FOREIGN PATENT DOCUMENTS 59-202420 11/1984 Japan .................. 350/96.2
2121532 12/1983 United Kingdom .

Primary Examiner—Vincent P. McGraw
Attorney, Agent, or Firm—Pollock, VandeSande and Priddy

[57] ABSTRACT

In a fiber optic gyroscope in which light from a light source is split into two beams for supply to one and the other end of an optical fiber coil respectively, and the two beams having propagated through the optical fiber coil and emitted the one and the other end thereof are coupled together for supply to a photodetector, there are separately formed on an optical integrated circuit substrate two optical waveguide couplers, each comprising a trunk and a pair of branches extending therefrom. The pair of branches of a first one of the two optical waveguide couplers are connected to the light source and the photodetector, respectively, and the pair of branches of the second optical waveguide coupler are connected to the one and the other end of the optical fiber coil, respectively. The trunks of the first and second optical waveguide couplers are interconnected via a connecting optical fiber. The optical integrated circuit substrate is fixed to a reinforcing plate of a material which has a thermal expansion coefficient nearly equal to that of the optical integrated circuit substrate. The reinforcing plate is held on a support structure by flexible holding means.

15 Claims, 3 Drawing Sheets

FIBER OPTIC GYROSCOPE USING OPTICAL WAVEGUIDE COUPLERS

BACKGROUND OF THE INVENTION

The present invention relates to a fiber optic gyroscope which employs an optical waveguide formed as an optical integrated circuit for splitting and coupling light.

There has been proposed a fiber optic gyroscope which utilizes, in place of an optical fiber coupler, an optical waveguide formed as an optical integrated circuit, for splitting light from a light source into two for propagation to an optical fiber coil forming a ring interferometer and for coupling two beams of light having propagated through the optical fiber coil for guiding it as interference light to a photodetector. FIG. 1 shows an example of such a fiber optic gyroscope, in which an optical fiber coil 61 is wound in layers around the periphery of a disc-shaped support structure 60 near one side thereof and a light source 62, a photodetector 63 and an optical integrated circuit substrate 70 are mounted on the support structure 60 inside the optical fiber coil 61. The optical integrated circuit substrate 70 is a rectangular electro-optic crystalline plate as of lithium niobate and has on its one surface an optical waveguide 74 formed by diffusing thereinto, for example, titanium in a desired strip pattern. The optical waveguide 74 comprises a trunk 71, a pair of branches 72a and 72b which diverge from the trunk 71 at one end thereof, and another pair of branches 73a and 73b which similarly diverges from the trunk 71 at the other end. The pair of branches 72a and 72b and the trunk 71 constitute a 3dB coupler, whereas the pair of branches 73a and 73b and the trunk 71 also constitute a 3dB coupler. Optical connectors 76 and 77 are provided at opposite ends of the optical integrated circuit substrate 70. The branches 72a and 72b of the optical waveguide 74 are connected to one and the other ends 61a and 61b of the optical fiber coil 61, and the branches 73a and 73b are connected via optical fibers 78 and 79 to the light source 62 and the photodetector 63, respectively. An electric circuit unit 80 is mounted on the other side of the support structure 60.

Though not shown, an electrode pair for phase modulation is provided for either one or both of the branches 72a and 72b of the optical waveguide 74, and the electric circuit unit 80 includes a phase modulation signal generator for supplying a phase modulation signal to the above-mentioned electrode pair and a synchronous detector for synchronous/detection of an output signal from the photodetector 63 by the phase modulation signal to obtain the output of the fiber optic gyroscope. The trunk 71 of the optical waveguide 74 is so formed as to produce a polarization effect.

Light from the light source 62 passes through the optical fiber 78 and is applied from the branch 73a of the optical waveguide 74 via the trunk 71 to the branches 72a and 72b, that is, the light is split into two beams. At this time, either one or both of the beams of light are phase modulated by the application of the above mentioned phase modulation signal to the above-mentioned electrode pairs. As a result, the one light is supplied as left-handed light to the optical fiber coil 61 from its one end 61a and the other light is supplied as right-handed light to the optical fiber coil 61 from the other end 61b. The left-handed light and the right-handed light having propagated through the optical fiber coil 61 are supplied to the trunk 71 of the optical waveguide 74 via its branches 72b and 72a from the other and the one end 61b and 61a of the optical fiber coil 61, respectively, whereby they are coupled together. The resulting interference light is applied from the branch 73b of the optical waveguide 74 via the optical fiber 79 to the photodetector 63, wherein it is converted into an electric signal, which is subjected to synchronous modulation by the above-mentioned phase modulation signal, providing the output of the fiber optic gyroscope. Further, a base 91 is mounted on one side of the support structure 60 and the optical integrated circuit substrate 70 is fixedly mounted directly on the base 91 with an adhesive 92 as shown in FIGS. 2 and 3.

In the conventional fiber optic gyroscope described above, since the optical waveguide 74 formed on the optical integrated circuit substrate 70, which is disposed inside the optical fiber coil 61 serving as the ring interferometer, includes the pair of sufficiently long branches 72a, 72b and 73a, 73b which are arranged straight at opposite ends of the sufficiently long trunk 71, the optical integrated circuit substrate 70 is long and the diameter of the loop of the optical fiber coil 61 encompassing it is large accordingly. Thus, the fiber optic gyroscope is inevitably bulky as a whole.

Moreover, since the prior art fiber optic gyroscope mentioned above has the optical integrated circuit substrate 70 joined directly to the base 91 with the adhesive 92, accidental heating from the outside, such as an ambient temperature rise, will develop a high thermal stress in the optical integrated circuit substrate 70 owing to the difference in thermal expansion coefficient between the electro-optic crystal forming the integrated circuit substrate 70 and the base 91 to thermally distort the electro-optic crystal and hence change its refractive index, introducing an error in the output of the fiber optic gyroscope.

SUMMARY OF THE INVENTION

It is therefore an object of the present invention to provide a small-diameter fiber optic gyroscope which employs an optical waveguide formed as an optical integrated circuit for splitting and coupling light.

Another object of the present invention is to provide a fiber optic gyroscope of a structure which reduces thermal distortion of an electro-optic crystal forming an optical integrated circuit used for splitting and coupling light.

According to an aspect of the present invention, in a fiber optic gyroscope which includes a light source, an optical fiber coil forming a ring interferometer, a photodetector and an optical integrated circuit substrate disposed inside the optical fiber coil, there are separately provided on the optical integrated circuit substrate first and second optical waveguide couplers each of which comprises a trunk and a pair of branches extending therefrom. The first optical waveguide coupler has its branches connected to the one and the other end of the optical fiber coil and has its trunk connected via an optical fiber to the trunk of the second optical waveguide coupler, which, in turn, has its one branch connected via an optical fiber to the light source and the other branch connected via an optical fiber to the photodetector.

With such a structure, since the first and second optical waveguide couplers are provided separately of each other on the optical integrated circuit substrate disposed inside the optical fiber coil, the entire length of the optical integrated circuit substrate can be reduced to about one half that needed in the past. Accordingly, the loop diameter of the optical fiber coil disposed outside the optical integrated circuit substrate can be made markedly smaller than in the prior art, permitting a substantial reduction of the overall size of the fiber optic gyroscope.

According to another aspect of the present invention, there is provided a fiber optic gyroscope which includes a light source, an optical fiber coil constituting a ring interferometer, a photodetector and an optical integrated circuit substrate whereby light from the light source is split into two beams for supply to the optical fiber coil and the two beams of light having propagated through the optical fiber coil are coupled together for supply to the photodetector. In this fiber optic gyroscope the optical integrated circuit substrate is fixed to a reinforcing plate made of the same electro-optic crystal as that used for the optical integrated circuit substrate, or a material of about the same thermal expansion coefficient as that of the electro-optic crystal, and this reinforcing plate is held by flexible means on a support structure.

In such a fiber optic gyroscope in which the reinforcing plate is displaceably held by the flexible means on the support structure, even if a thermal stress develops in the reinforcing plate owing to the difference in thermal expansion between the reinforcing plate and the support structure when the fiber optic gyroscope is heated externally, the reinforcing plate is displaced relative to the support structure to thereby absorb the thermal stress. At the same time, since the optical integrated circuit substrate and the reinforcing plate are formed of the same electro-optic crystal, or since the reinforcing plate is formed of a material whose thermal expansion coefficient is about the same as that of the optical integrated circuit substrate, no high thermal stress will be produced directly in the optical integrated circuit substrate due the difference between their thermal expansion coefficients. Accordingly, substantially no thermal distortion is developed in the electro-optic crystal forming the optical integrated circuit substrate, practically eliminating the possibility of inducing errors in the output of the fiber optic gyroscope by a change in the refractive index of the electro-optic crystal due to its thermal distortion.

DESCRIPTION OF THE PREFERRED EMBODIMENTS

Figure 4:
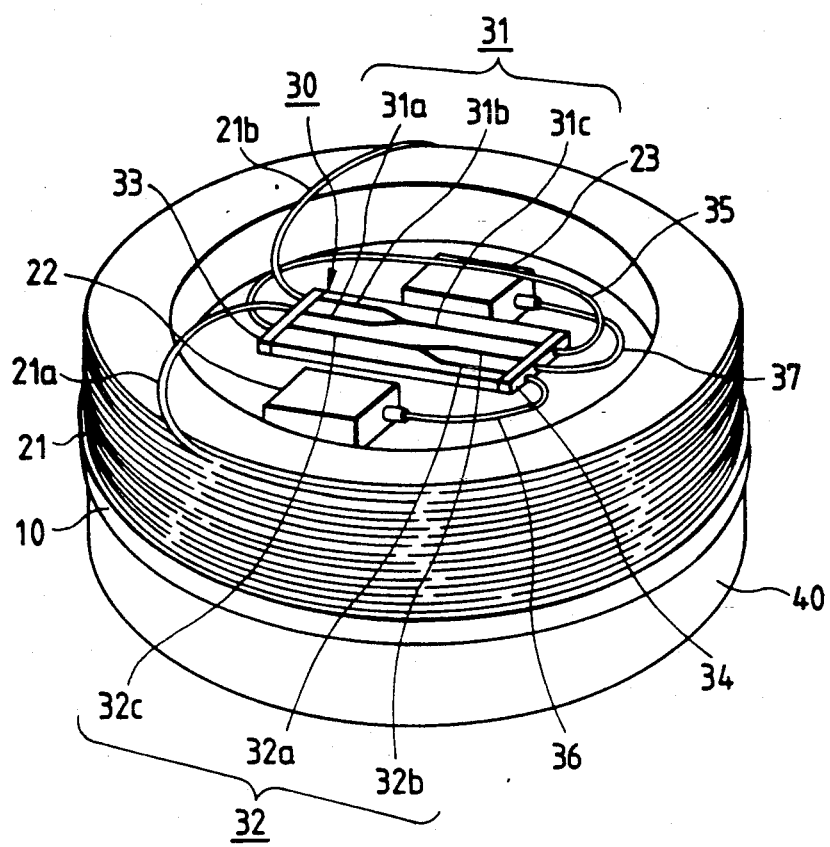
FIG. 4 is a perspective view illustrating an example of the fiber optic gyroscope of the present invention.

FIG. 4 illustrates an example of the fiber optic gyroscope of the present invention. A disc-shaped support structure 10 as of aluminum or stainless steel has wound in layers therearound on the upper half of its peripheral surface an optical fiber coil 21 which constitutes a ring interferometer. On the top of the support structure 10 there are disposed a light source 22, a photodetector 23 and an optical integrated circuit substrate 30. The optical integrated circuit substrate 30 is formed by a rectangular electro-optic crystalline plate as of lithium niobate and has a desired strip pattern or patterns formed by diffusion of, for example, titanium thereinto. In the embodiment there are formed on the same crystalline plate first and second optical waveguide couplers 31 and 32 in separate but parallel relation. These couplers 31 and 32 are both 3 dB couplers. The first optical waveguide coupler 31 comprises a pair of branches 31a and 31b which extend in parallel from one end of the optical integrated circuit substrate 30 and join each other at a small angle, and a trunk 31c which extends from the juncture of the branches 31a and 31b to the other end of the optical integrated circuit substrate 30. The second optical waveguide coupler 32 comprises a trunk 32c which extends from the one end of the optical integrated circuit substrate 30, and a pair of branches 32a and 32b which branch off from the end of the trunk 32c at a small angle and extend in parallel to the other end of the optical integrated circuit substrate 30. At the one and the other end of the optical integrated circuit substrate 30 there are provided optical connectors 33 and 34, respectively. The branches 31a and 31b of the first optical waveguide coupler 31 are connected to the one end 21a and the other end 21b of the optical fiber coil 21, the trunk 31c of the first optical waveguide coupler 31 and the trunk 32c of the second optical waveguide coupler 32 are interconnected via an optical fiber 35, and the branches 32a and 32b of the second optical waveguide coupler 32 are connected to the light source 22 and the photodetector 23 via optical fibers 36 and 37, respectively. On the other side of the support structure 10 there is mounted an electric circuit unit 40.

Though not shown, an electrode pair for phase modulation use is provided for either one or both of the branches 31a and 31b of the first optical waveguide coupler 31, and the electric circuit unit 40 includes a phase modulation signal generator for supplying a phase modulation signal to the above-mentioned electrode pair and a synchronous for synchronous detector of an output signal from the photo-detector 23 by the phase modulation signal to obtain the output of the fiber optic gyroscope.

Light from the light source 22 travels through the optical fiber 36 and the branch 32a of the second optical waveguide coupler 32 to its trunk 32c and thence propagates through the optical fiber 35 and the trunk 31c of the first optical waveguide coupler 31 to its branches 31a and 31b; thus, the light emitted from the light source 22 is split into two beams. Either one or both of the beams of light are phase modulated by the application of the above mentioned phase modulation signal to the electrode pairs, and as a result of this, the one light is supplied as left-handed light to the optical fiber coil 21 from its one end 21a, whereas the other light is supplied as right-handed light to the optical fiber coil 21 from the other end 21b thereof. The left-handed light and the right-handed light both having propagated through the optical fiber coil 21 are supplied to the trunk 31c of the first optical waveguide coupler 31 through its branches 31b and 31a from the other end 21b and the one end 21a of the optical fiber coil 21, whereby they are coupled together. The resulting interference light is supplied through the optical fiber 35 to the trunk 32c of the second optical waveguide coupler 32, and a portion of the light thus supplied thereto is provided via the optical fiber 37 to the photodetector 23, wherein it is converted into an electric signal. The electric signal thus obtained is subjected to synchronous detection by the above-mentioned phase modulation signal to create the output of the fiber optic gyroscope.

Figure 1:
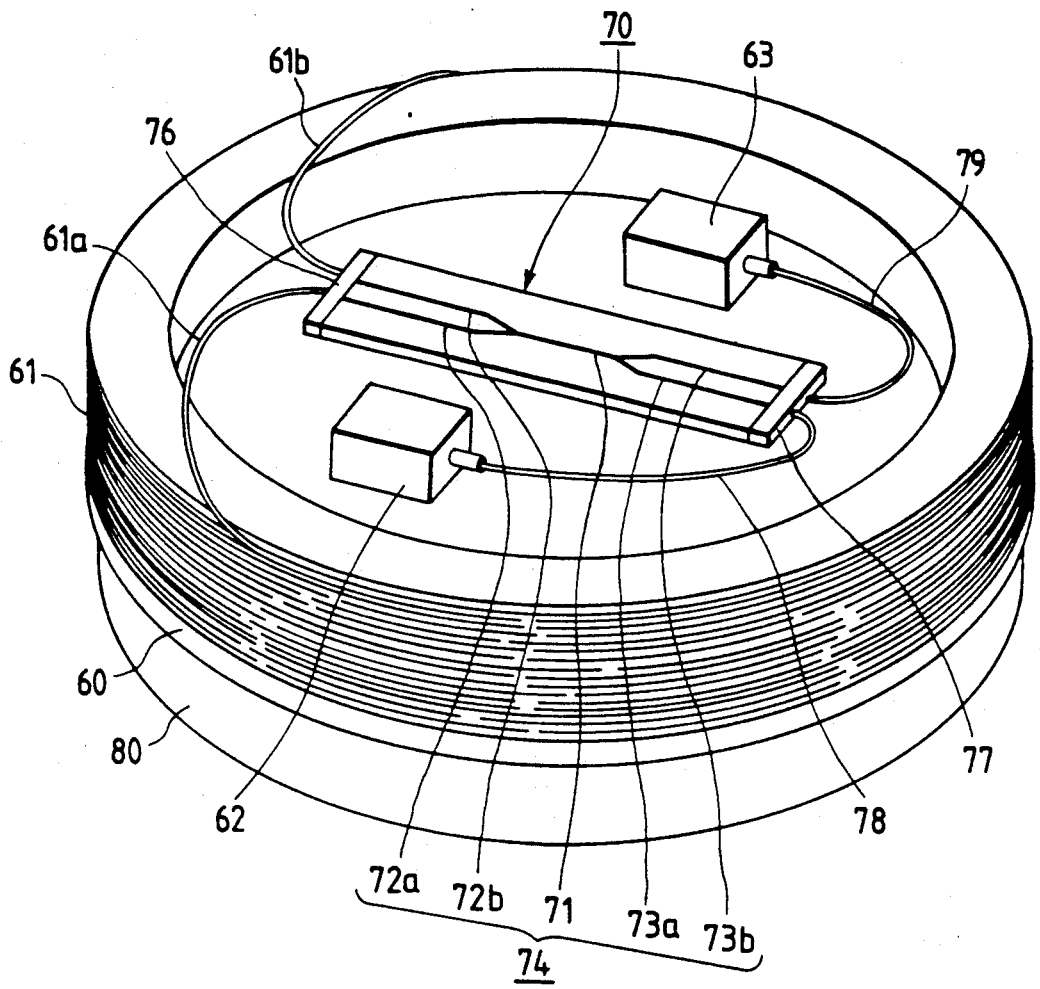
FIG. 1 is a perspective view showing an example of a conventional fiber optic gyroscope.
Figure 2:
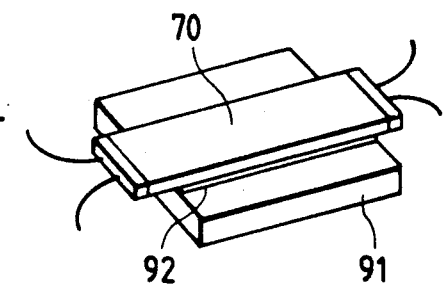
FIG. 2 is a perspective view showing a support structure for an optical integrated circuit substrate in the conventional fiber optic gyroscope.
Figure 3:
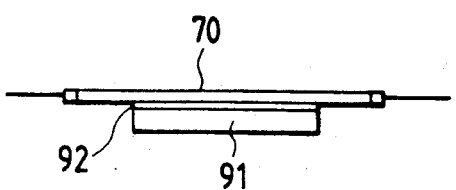
FIG. 3 is a side view of the support structure depicted in FIG. 2.

In this embodiment, since the optical integrated circuit substrate 30, which is disposed inside the optical fiber coil 21 forming a ring interferometer, has the first and second optical waveguide couplers 31 and 32 separated from each other as described above, the entire length of the optical integrated circuit substrate 30 from one end to the other can be reduced to about one half that of the optical integrated circuit substrate used in the prior art fiber optic gyroscope shown in FIG. 1. As a result, the diameter of the optical fiber coil 21 inside of which the optical integrated circuit substrate 30 is disposed can be made far smaller than in the conventional fiber optic gyroscope, and accordingly the entire structure of the fiber optic gyroscope of the present invention can be formed far smaller than the conventional gyroscope as will be seen from FIG. 4.

Figure 5:
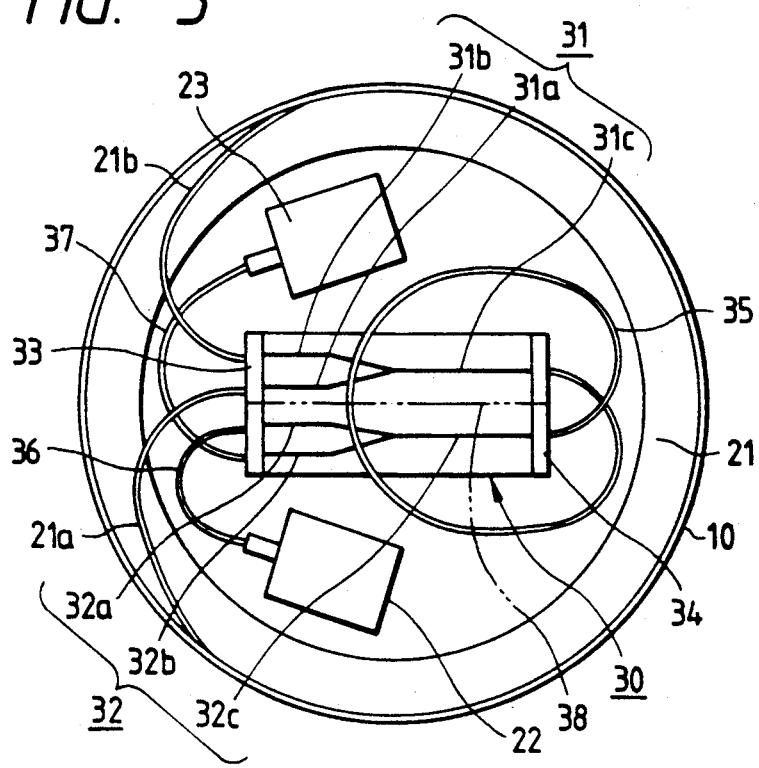
FIG. 5 is a plan view illustrating another example of the fiber optic gyroscope of the present invention.

FIG. 5 illustrates another embodiment of the fiber optic gyroscope of the present invention, in which the branches 31a and 31b of the first optical waveguide coupler 31 and the branches 32a and 32b of the second optical waveguide coupler 32 are formed side by side on the optical integrated circuit substrate 30 near its one end and trunks 31c and 32c of the first and second optical waveguide couplers 31 and 32 are formed side by side on the optical integrated circuit substrate 30 near the other end thereof. This embodiment operates in the same manner as does the embodiment of FIG. 4, producing the same effect as mentioned above.

Obviously, the optical integrated circuit substrate 30 may be divided into two as indicated by the broken line 38 in FIG. 5. In other words, the first and second optical waveguide couplers 31 and 32 may be formed on two separate rectangular optical integrated circuit substrates. In this instance, the two optical integrated circuit substrates may be disposed one above the other in parallel to or across each other, though not shown.

Figure 6:
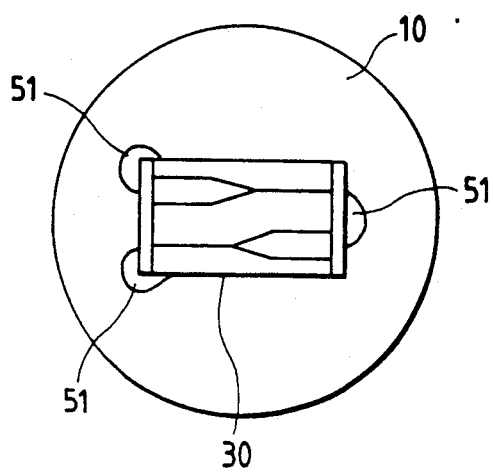
FIG. 6 is a plan view showing an example of the optical integrated circuit substrate support structure in the fiber optic gyroscope of the present invention.
Figure 7:
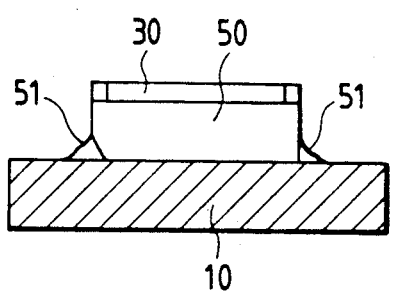
FIG. 7 is a side view of the support structure depicted in FIG. 6.

FIGS. 6 and 7 illustrate an example of the support structure for the optical integrated circuit substrate in the fiber optic gyroscope of the present invention. The optical integrated circuit substrate 30 is joined, with an adhesive, to a rectangular reinforcing plate 50 made of lithium niobate which is the electro-optic crystal forming the optical integrated circuit substrate 30, or K-Model (trade name) which has about the same thermal expansion coefficient as that of the lithium niobate. The reinforcing plate 50 is fixed to the support structure 10, for example, at three points, using an adhesive 51 as of the silicon rubber series which has appropriate elasticity. That is, the rubber-like adhesive 51 constitutes flexible holding means.

In this embodiment, even if the reinforcing plate 50 and the support structure 10 have different thermal expansion coefficients, the difference in their thermal expansion by external heat will be mostly absorbed by an elastic deformation of the adhesive 51. In this case, the stress which is applied to the reinforcing plate 50 by the elastic deformation of the adhesive 51 is so small that deformation of the reinforcing plate 50 by the stress is negligibly small. Thus, the difference in thermal expansion coefficient between the reinforcing plate 50 and the support structure 10 will impose substantially no stress on the optical integrated circuit substrate 30. Additionally, since the reinforcing plate 50 is made of the same electro-optic crystal as that used for the optical integrated circuit substrate 30, or a material of a thermal expansion coefficient nearly equal to that of the electro-optic crystal, no great stress will be induced directly in the optical integrated circuit substrate 30 owing to the difference in their thermal expansion, either. Thus, a possible change in the refractive index of the electro-optic crystal by the stress distortion therein will be extremely limited, and consequently, the output of the fiber optic gyroscope will be practically error-free.

Figure 8:
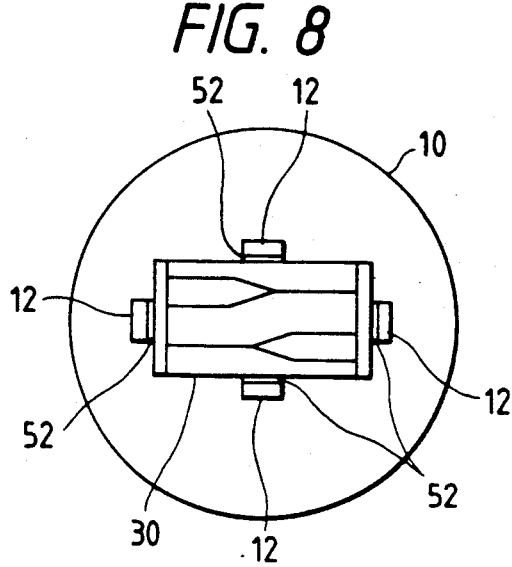
FIG. 8 is a plan view illustrating another example of the optical integrated circuit substrate support structure in the fiber optic gyroscope of the present invention.
Figure 9:
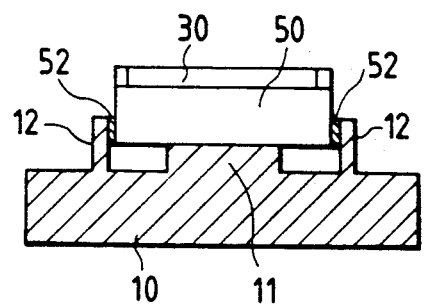
FIG. 9 is a side view of the support structure depicted in FIG. 8.

FIGS. 8 and 9 illustrate another example of the optical integrated circuit substrate support structure in the fiber optic gyroscope of the present invention. The optical integrated circuit substrate 30 is fixed to the reinforcing plate 50 with an adhesive or the like. On the top of the support structure 10 there are protrusively provided, by cutting, a bed 11 shorter and narrower than the optical integrated circuit substrate 30 and two pairs of thin plate-like support pieces 12 taller than the bed 11 and opposed there-across on all sides. The reinforcing plate 50 with the optical integrated circuit substrate 30 fixedly mounted thereon is placed on the bed 11 and joined with an adhesive 52 to the thin plate-like support pieces 12 of the support structure 10. The support pieces 12 form flexible holding means. Incidentally, there are defined around the bed 11 spaces for preventing a flow of the adhesive 52.

Figure 10:
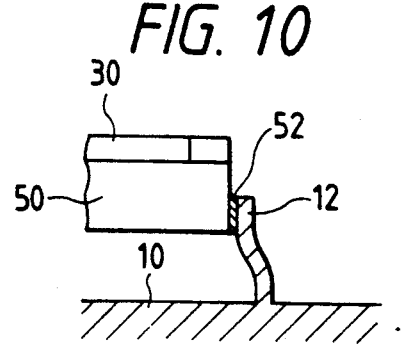
FIG. 10 is a sectional view showing deformation of a part of the support structure of FIG. 8 when a thermal stress is induced therein.

In this embodiment as well, even if the reinforcing plate 50 and the support structure 10 have different thermal expansion coefficients, the thin plate-shaped support pieces 12 supporting the reinforcing plate 50 are readily deformed by external heat as shown on an enlarged scale in FIG. 10, affording reduction of the stress which is applied to the reinforcing plate 50. Moreover, since the reinforcing plate 50 is formed of the same electro-optic crystal as that used for the optical integrated circuit substrate 30, or a material having a thermal expansion coefficient substantially equal to that of the electro-optic crystal, no great stress will be induced directly in the optical integrated circuit substrate 30 owing to the difference in their thermal expansion, either. Thus, a possible change in the refractive index of the electro-optic crystal by the stress distortion therein will be so small that the fiber optic gyroscope will produce its output with practically no error.

Figure 11:
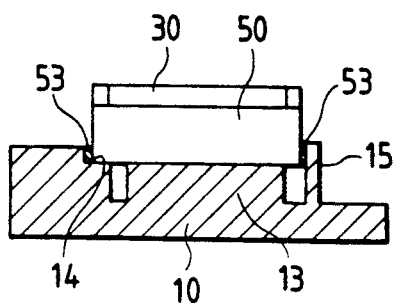
FIG. 11 is a sectional view illustrating yet another example of the optical integrated circuit substrate support structure in the fiber optic gyroscope of the present invention.

FIG. 11 illustrates yet another example of the optical integrated circuit substrate support structure in the fiber optic gyroscope according to the present invention. The optical integrated circuit substrate 30 is bonded to the reinforcing plate 50 with an adhesive or the like. The support structure 10 has a bed 13 and a combination of a stepped portion 14 and a thin plate-like support piece 15 which support the reinforcing plate 50 at its opposite ends in its lengthwise direction. The reinforcing plate 50 carrying the optical integrated circuit substrate 30 is mounted on the bed 13 and joined, with an adhesive 53, to the stepped portion 14 and the thin plate-like support piece 15 of the support structure 10. This example also produces the same effect as described previously with respect to FIGS. 8, 9 and 10.

As described above, according to the present invention, since the first and second optical waveguide couplers, each composed of a trunk and a pair of branches extending therefrom, are formed separately from each other on the optical integrated circuit substrate 30, the entire structure of the fiber optic gyroscope can be made appreciably smaller than in the past.

Furthermore, the optical integrated circuit substrate is fixedly mounted on a reinforcing plate made of the same electro-optic crystal as that for the optical integrated circuit substrate, or a material of a thermal expansion coefficient nearly equal to that of the electro-optic crystal, and the reinforcing plate is held on a support structure by flexible holding means. Hence, substantially no thermal distortion occurs in the electro-optic crystal forming the optical integrated circuit substrate, and accordingly, there is practically no possibility of inducing an error in the output of the fiber optic gyroscope by a change in the refractive index of the electro-optic crystal which results from its thermal distortion.

It will be apparent that many modifications and variations may be effected without departing from the scope of the novel concepts of the present invention.

What is claimed is:

1. A fiber optic gyroscope comprising:
an optical fiber coil forming a ring interferometer;
a light source;
a photodetector; and
an optical integrated circuit substrate means disposed inside said optical fiber coil and connected to said light source, to said photo-detector and to both ends of said optical fiber coil;
said optical integrated circuit substrate means having formed thereon a first optical waveguide coupler including first and second branches connected at one ends thereof to said light source and said photodetector via first and second connecting optical fibers, respectively, and each extending from an edge of said optical integrated circuit substrate means substantially in parallel in a first direction but gradually approaching each other and coupled together at their other ends to a first trunk extending from the juncture of said first and second branches in said first direction to a free end of said first trunk which is disposed adjacent another edge of said optical integrated circuit substrate means, and a second optical waveguide coupler including third and fourth branches connected at one ends thereof to the one and the other end of said optical fiber coil, respectively, and each extending from an edge of said optical integrated circuit substrate means substantially in parallel in a second direction but gradually approaching each other and coupled together at their other ends to a second trunk extending from the juncture of said third and fourth branches in said second direction to a free end of said second trunk which is disposed adjacent another edge of said optical circuit substrate means, said first and second trunks having their free ends interconnected to one another via a third connecting optical fiber.

2. The fiber optic gyroscope of claim 1 wherein said optical integrated circuit substrate means includes a substantially rectangular electro-optic crystalline plate, said first and second branches are connected at said one ends thereof to said light source and said photodetector via said first and second connecting optical fibers, respectively, at a first side of said electro-optic crystalline plate, said third and fourth branches are connected at said one ends thereof to said one end and said other end of said optical fiber coil, respectively, at a second side of said electro-optic crystalline plate opposite said first side thereof, and said free ends of said first and second trunks are connected to the one and the other end of said third connecting optical fiber at said second and first sides of said electro-optic crystalline plate, respectively.

3. The fiber optic gyroscope of claim 1 wherein said optical integrated circuit substrate means is a substantially rectangular electro-optic crystalline plate, said first and second branches are connected at said one ends thereof to said light source and said photo-detector via said first and second connecting optical fibers, respectively, at a first side of said electro-optic crystalline plate, said third and fourth branches are connected at said one ends thereof to said one end and said other end of said optical fiber coil, respectively, at said first side of said electro-optic crystalline plate, and said free ends of said first and second trunks are connected to said one end and said other end of said third connecting optical fiber, respectively, at a second side of said electro-optic crystalline plate opposite said first side thereof.

4. The fiber optic gyroscope of claim 1, 2, or 3 wherein said light source and said photodetector are disposed inside said optical fiber coil.

5. The fiber optic gyroscope of claim 1, 2, or 3 wherein said optical integrated circuit substrate means is fixed to a reinforcing plate of a material having a thermal expansion coefficient substantially equal to that of said optical integrated circuit substrate means, said reinforcing plate being held by flexible holding means on a support structure inside said optical fiber coil.

6. The fiber optic gyroscope of claim 5 wherein said flexible holding means is an adhesive whereby said reinforcing plate is elastically bonded to the top of said support structure at a plurality of places.

7. The fiber optic gyroscope of claim 5 wherein said flexible holding means has at least two thin plate-like support pieces protrusively provided on the top of said support structure in opposed relation to at least two opposite sides of said reinforcing plate, and said reinforcing plate is disposed between said two thin plate-like support pieces and is bonded thereto with an adhesive.

8. The fiber optic gyroscope of claim 7 wherein a bed shorter than said two thin plate-like support pieces is protrusively provided on the top of said support structure between said two thin plate-like support pieces, and said reinforcing plate is mounted on said bed.

9. The fiber optic gyroscope of claim 1 wherein said optical integrated circuit substrate means includes:
an optical integrated circuit substrate having said first and second optical waveguide couplers formed thereon; a support structure;

a reinforcing plate of a material having a thermal expansion coefficient substantially equal to that of said optical integrated circuit substrate, said reinforcing plate having fixed thereto said optical integrated circuit substrate; and flexible holding means for displaceably holding said reinforcing plate on said support structure.

10. The fiber optic gyroscope of claim 9 said flexible holding means includes an adhesive of the rubber series for elastically bonding said reinforcing plate to the top of said support structure at a plurality of places.

11. The fiber optic gyroscope of claim 9 wherein said flexible holding means includes at least two thin plate-like support pieces protrusively provided on the top of said support structure in opposed relation to at least two opposite sides of said reinforcing plate, and said reinforcing plate is disposed between said two thin plate-like support pieces and is bonded thereto with an adhesive.

12. The fiber optic gyroscope of claim 11 wherein a bed shorter than said two thin plate-like support pieces is protrusively provided on the top of said support structure between said two thin plate-like support pieces, and said reinforcing plate is mounted on said bed.

13. The fiber optic gyroscope of claim 9 wherein said reinforcing plate is formed of the same material as that for said optical integrated circuit substrate.

14. The fiber optic gyroscope of claim 5 wherein said reinforcing plate is made of the same material as that of said optical integrated circuit substrate.

15. The fiber optic gyroscope of the type comprising a light source; an optical fiber coil; a photodetector; and an optical integrated circuit substrate having an optical waveguide formed thereon for splitting light from said light source into two for supply to one and the other ends of said optical fiber coil, the two rays of light propagated through said optical fiber coil and emitted from said one end and said other end thereof being coupled together for supply to said photodetector; the improvement comprising:

a reinforcing plate of a material having a thermal expansion coefficient substantially equal to that of said optical integrated circuit substrate, said reinforcing plate having said optical integrated circuit substrated fixed thereto;

a support structure having formed protrusively thereon a bed on which said reinforcing plate is mounted; and flexible holding means for displaceably holding said reinforcing plate on said bed, said flexible holding means including at least two thin plate-like support pieces protrusively formed on top of said support structure in opposing relation to each other across said bed, said support pieces being higher than said bed and holding said reinforcing plate therebetween, said reinforcing plate being bonded to said two thin plate-like support pieces with an adhesive.

* * * * *